(12) United States Patent
Longoria

(10) Patent No.: US 11,499,588 B1
(45) Date of Patent: Nov. 15, 2022

(54) FASTENING DEVICE

(71) Applicant: Eduardo Longoria, San Benito, TX (US)

(72) Inventor: Eduardo Longoria, San Benito, TX (US)

( * ) Notice: Subject to any disclaimer, the term of this patent is extended or adjusted under 35 U.S.C. 154(b) by 0 days.

(21) Appl. No.: 17/363,114

(22) Filed: Jun. 30, 2021

(51) Int. Cl.
| | |
|---|---|
| *F16B 47/00* | (2006.01) |
| *F16B 45/00* | (2006.01) |
| *F16M 13/02* | (2006.01) |

(52) U.S. Cl.
CPC ............ *F16B 47/00* (2013.01); *F16B 45/00* (2013.01); *F16M 13/022* (2013.01)

(58) Field of Classification Search
CPC ........ F16B 47/00; F16B 45/00; F16M 13/022
USPC .............................................. 248/205.5, 683
See application file for complete search history.

(56) References Cited

U.S. PATENT DOCUMENTS

| | | | | |
|---|---|---|---|---|
| 2,202,242 A | * | 5/1940 | Wortham | A47G 29/08 |
| | | | | 248/205.5 |
| D132,122 S | * | 4/1942 | Anderson | D6/537 |
| 3,011,649 A | * | 12/1961 | Porter | A24F 15/00 |
| | | | | 248/205.5 |
| D266,932 S | * | 11/1982 | Liset | D3/266 |
| 6,749,165 B2 | * | 6/2004 | Immerman | A47G 1/17 |
| | | | | 248/205.5 |
| 6,814,335 B2 | * | 11/2004 | Immerman | A47G 25/0614 |
| | | | | 248/205.5 |
| 6,869,053 B2 | | 3/2005 | Adams, IV | |
| 7,021,593 B1 | | 4/2006 | Fan | |
| D889,162 S | | 7/2020 | Elliot | |
| 2002/0100134 A1 | | 8/2002 | Dunn | |
| 2003/0201369 A1 | * | 10/2003 | Dretzka | F16B 47/00 |
| | | | | 248/206.3 |
| 2004/0163979 A1 | | 8/2004 | Bender | |
| 2012/0097821 A1 | * | 4/2012 | Hajianpour | F16B 47/00 |
| | | | | 248/363 |

FOREIGN PATENT DOCUMENTS

WO       WO0166319       9/2001

* cited by examiner

*Primary Examiner* — Muhammad Ijaz

(57) ABSTRACT

A fastening device for hanging items in a bathroom includes a cup, which is resiliently compressible and can be compressed against a surface to engage a first face of the cup to the surface. A wire is engaged to and extends from a second face of the cup. The wire is resiliently bendable so that opposed sections of the wire can be bent into a pair of hooks. The hooks can be used to support one or more articles in a fixed position relative to the surface.

11 Claims, 6 Drawing Sheets

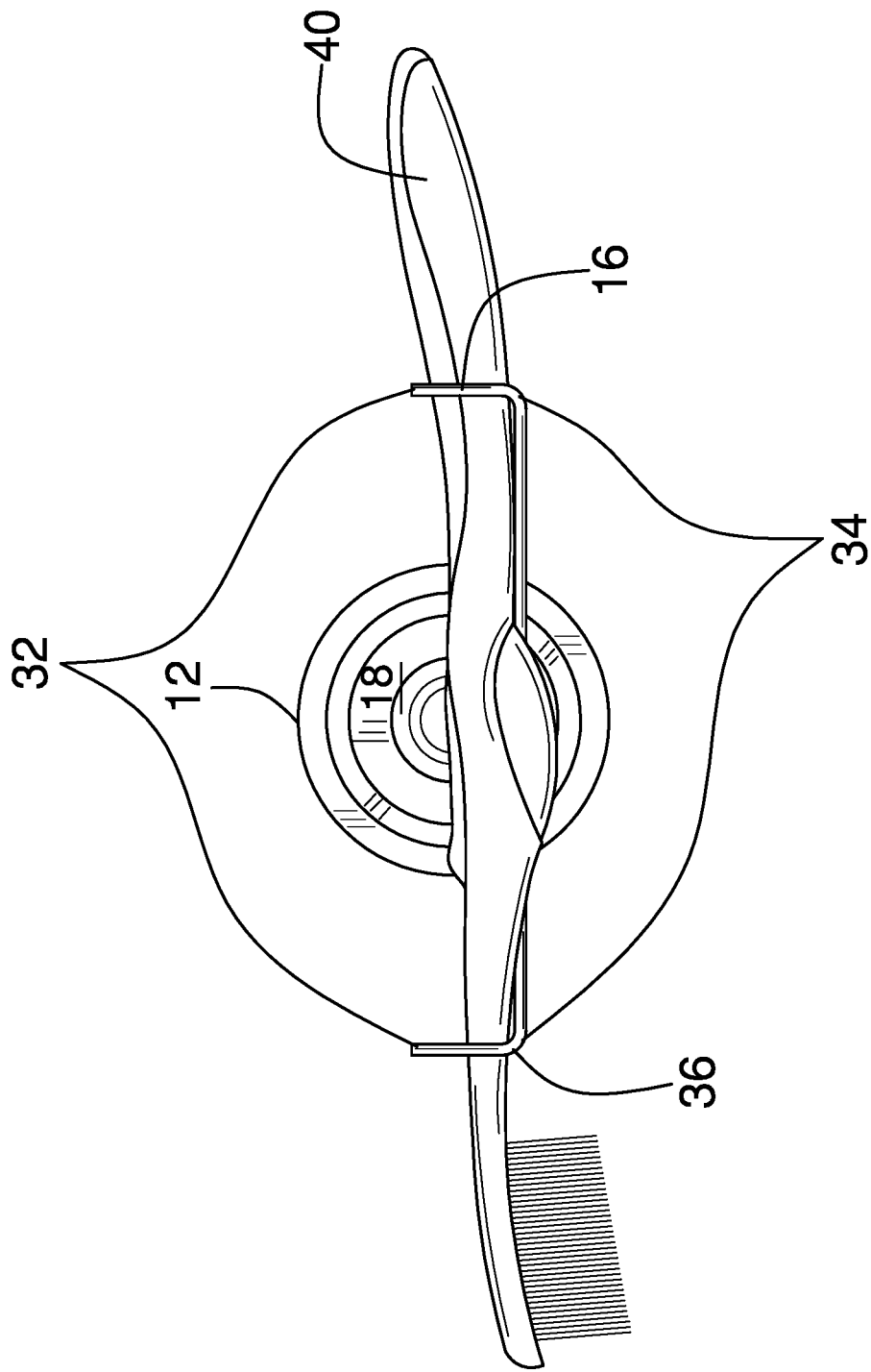

FASTENING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fastening devices and more particularly pertains to a new fastening device for hanging items in a bathroom. The present invention discloses a wire engaged to a suction cup, wherein the wire is bendable into a pair of hooks, which can be shaped and spaced to hang a respective article.

(2) Description of Related Art Including Information Disclosed Under 37 CFR 1.97 and 1.98

The prior art relates to fastening devices, and, in particular, fastening devices for hanging articles used in maintaining personal hygiene to a surface in a bathroom. The prior art includes articles with integral suction cups and articles that can be attached to suction cups. What is lacking in the prior art is a fastening device comprising a wire engaged to a suction cup. The wire is bendable into a pair of hooks, which can be shaped and spaced to hang a respective article. The wire being bendable allows a variety of articles to be hung from the surface.

BRIEF SUMMARY OF THE INVENTION

An embodiment of the disclosure meets the needs presented above by generally comprising a cup, which is resiliently compressible so that the cup is configured to be compressed against a surface to engage a first face of the cup to the surface. A wire is engaged to and extends from a second face of the cup. The wire is resiliently bendable so that opposed sections of the wire are configured to be bent into a pair of hooks. The hooks are configured to support one or more articles in a fixed position relative to the surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is an in-use view of an embodiment of the disclosure.

DETAILED DESCRIPTION OF THE INVENTION

Figure 1:
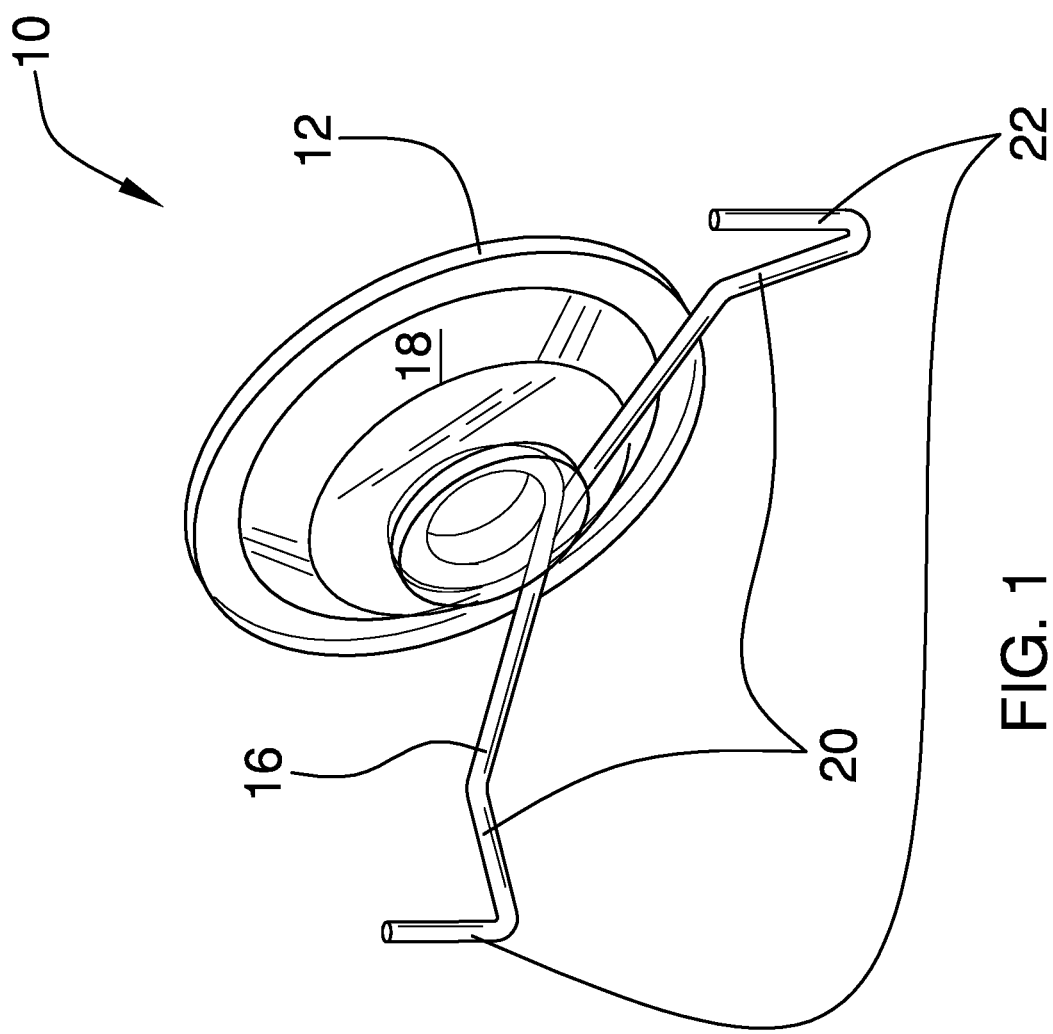
FIG. 1 is an isometric perspective view of a fastening device according to an embodiment of the disclosure.
Figure 2:
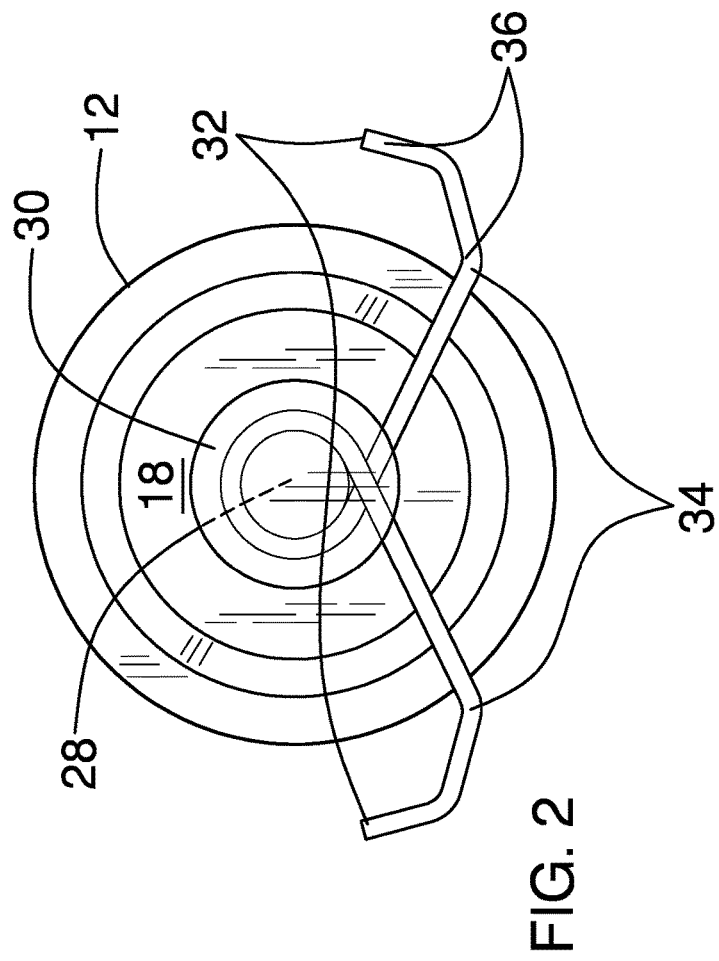
FIG. 2 is a front view of an embodiment of the disclosure.
Figure 3:
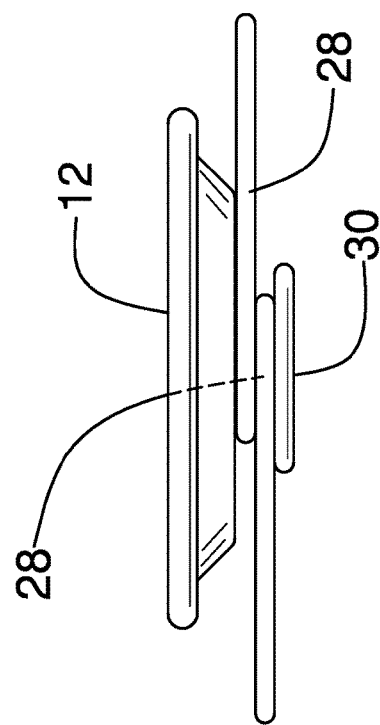
FIG. 3 is a bottom view of an embodiment of the disclosure.
Figure 5:
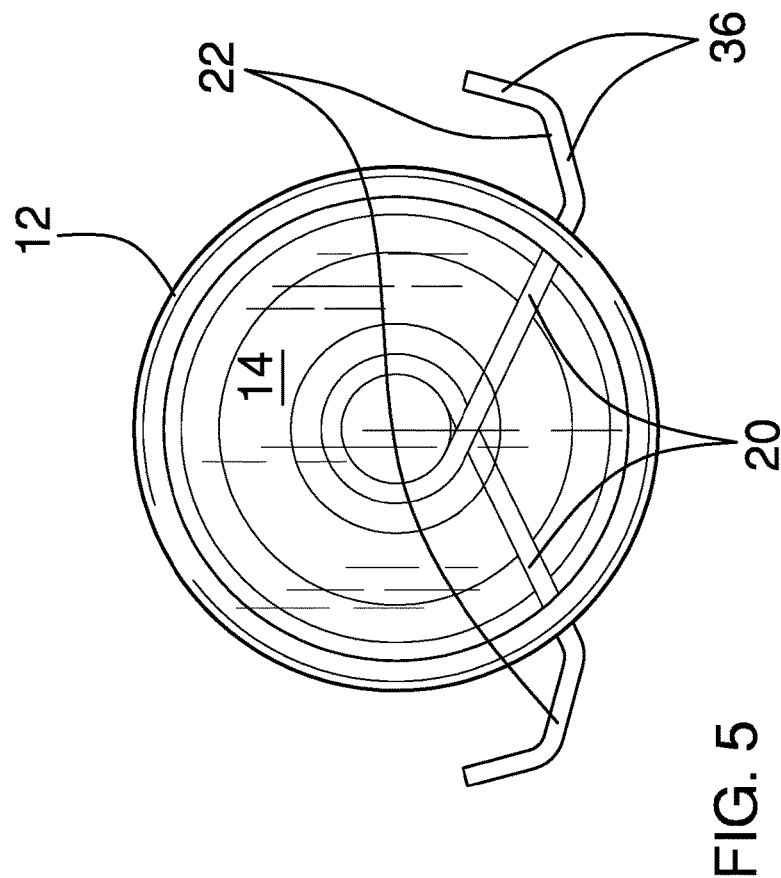
FIG. 5 is a rear view of an embodiment of the disclosure.
Figure 4:
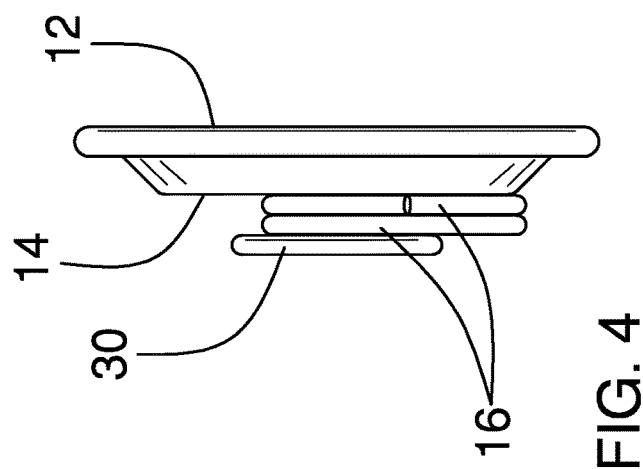
FIG. 4 is a side view of an embodiment of the disclosure.

With reference now to the drawings, and in particular to FIGS. 1 through 9 thereof, a new fastening device embodying the principles and concepts of an embodiment of the disclosure and generally designated by the reference numeral 10 will be described.

As best illustrated in FIGS. 1 through 9, the fastening device 10 generally comprises a cup 12, which is resiliently compressible so that the cup 12 is configured to be compressed against a surface to engage a first face 14 of the cup 12 to the surface. The cup 12 comprises one or more of silicone, rubber, or elastomer.

A wire 16 is engaged to and extends from a second face 18 of the cup 12. The wire 16 is resiliently bendable so that opposed sections 20 of the wire 16 are configured to be bent into a pair of hooks 22. The hooks 22 are configured to support one or more articles 24 in a fixed position relative to the surface. A coating 26 is positioned around the wire 16 so that the wire 16 is resistant to rusting. The coating 26 comprises rubber, silicone, or elastomer.

A post 28 is engaged to and extends from the second face 18 of the cup 12. The wire 16 is loopedly positioned around the post 28 so that the wire 16 is engaged to the post 28. A disc 30 is engaged to the post 28 distal from the cup 12. The disc 30 is circumferentially larger than the post 28 so that the disc 30 is positioned to prevent the wire 16 from sliding off the post 28. The present invention anticipates the wire 16 being engageable to the cup 12 by other engagement means, such as, but not limited to, adhesive engagement, insertion into a slot (not shown) in the post 28, insertion through a channel (not shown) positioned through the post 28, and the like.

The wire 16 is one of a plurality of wires 16. Each wire 16 has a respective length 32 so that the plurality of wires 16 comprises wires 16 having a variety of lengths 32. A respective wire 16 having an associated length 32 is selectively bendable around the post 28 to engage the respective wire 16 to the post 28. The opposed sections 20 of the respective wire 16 then are configured to be bent to create a pair of hooks 22 having a respective spacing 34 between the hooks 22 of the pair of hooks 22. Additionally, a respective distance can be created between each hook 22 and the surface, and a respective shape 36 for each hook 22 created so that the pair of hooks 22 is positioned to engage an associated article 24.

Figures 7, 8:
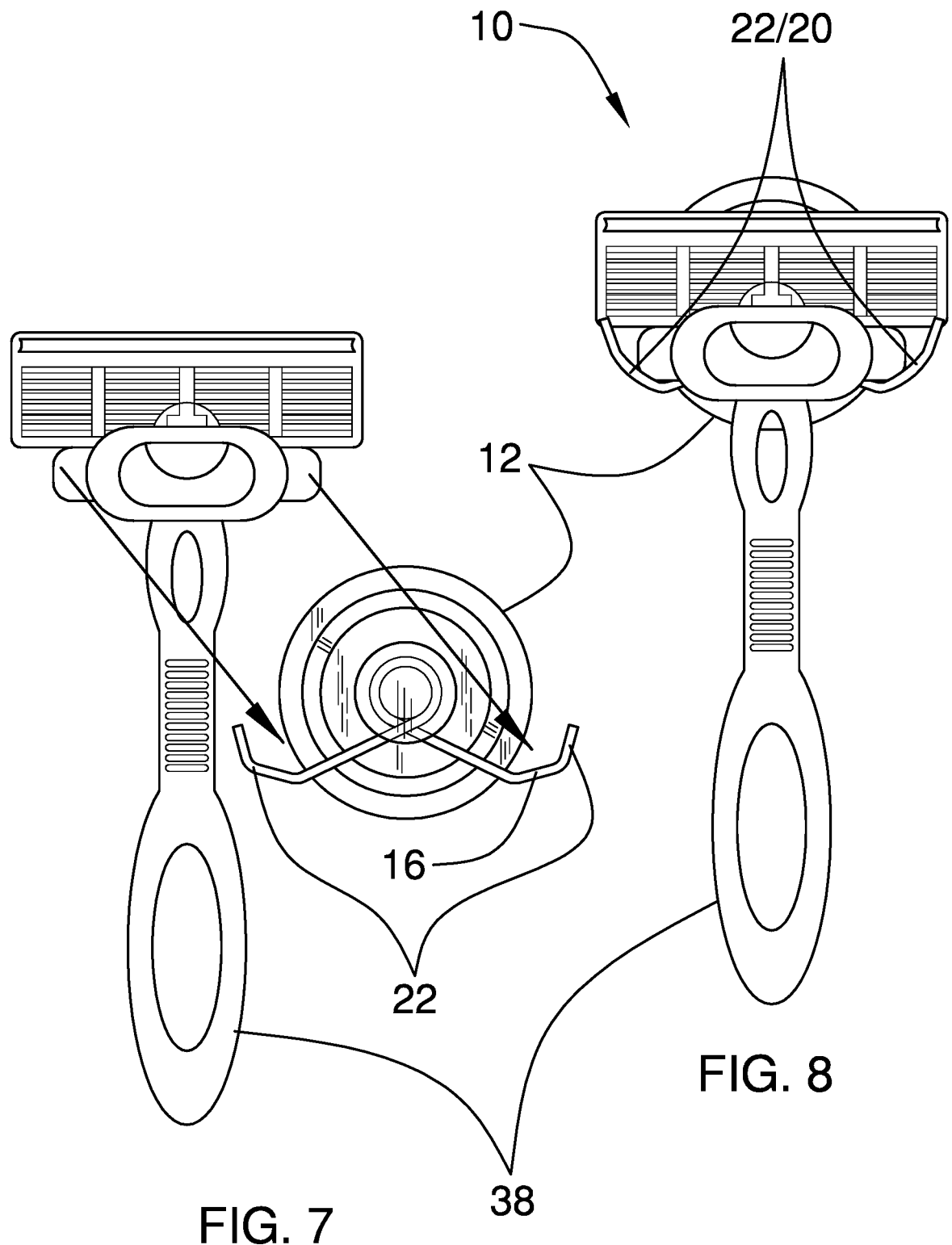
FIG. 7 is an in-use view of an embodiment of the disclosure.
FIG. 8 is an in-use view of an embodiment of the disclosure.
Figure 9:
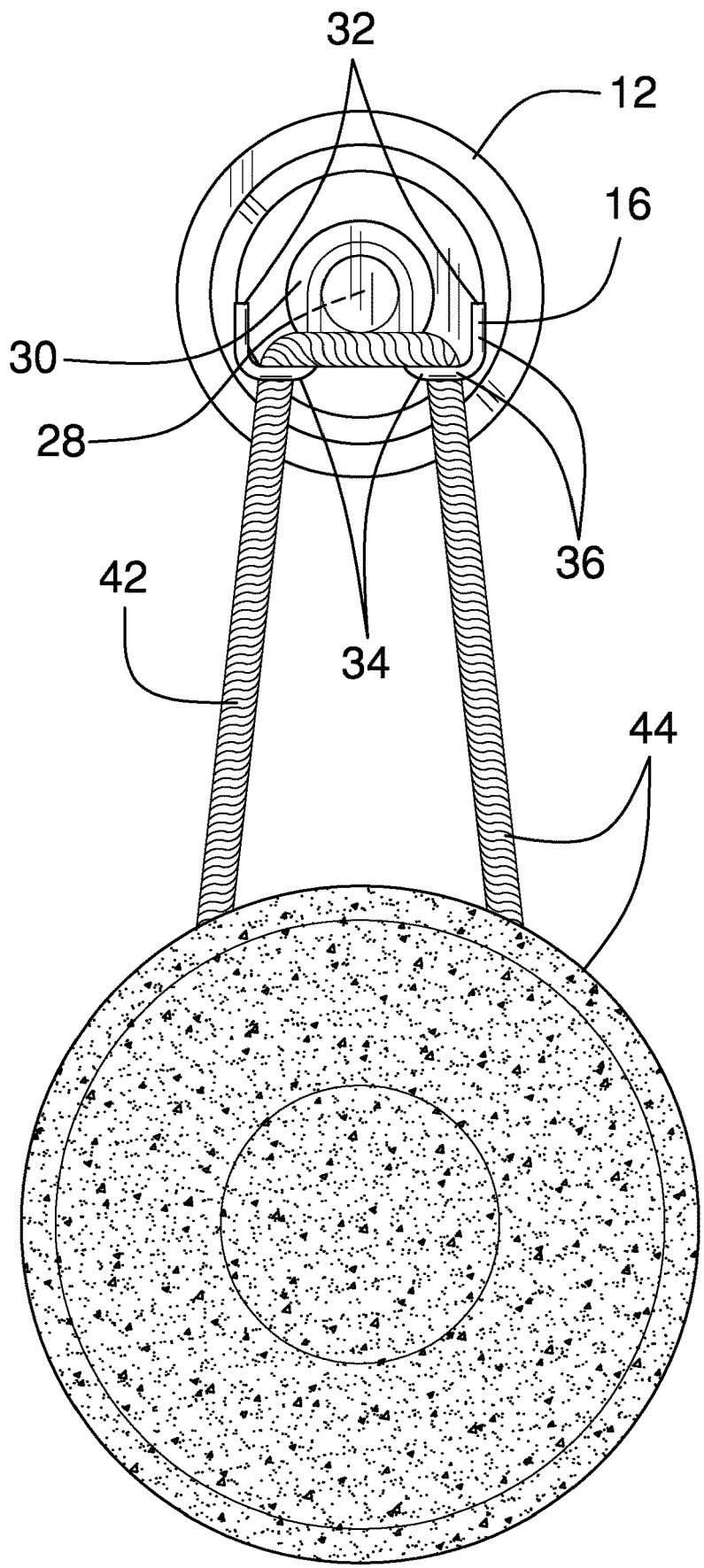
FIG. 9 is an in-use view of an embodiment of the disclosure.

In use, the cup 12 is affixed to the surface, such as a shower wall, by compressing it against the surface. A wire 16 from the plurality of wires 16 having a respective length 32 is selected and then bent around the post 28 to attach the wire 16 to the cup 12. The opposed sections 20 of the wire 16 then are bent and shaped to create a pair of hooks 22 suitable for supporting an associated article 24, such as an article 24 used in maintaining personal hygiene, for example, a razor 38, a toothbrush 40, or a hanging rope 42, such as a hanging rope 42 integral to a soap on a rope 44, a loofah, a brush, and the like. Hanging a razor 38, as shown in FIGS. 8 and 9, facilitates drying and deters rusting of the razor 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fastening device comprising:
   a cup, the cup being resiliently compressible, wherein the cup is configured for compressing against a surface for engaging a first face of the cup to the surface;
   a wire engaged to and extending from a second face of the cup, the wire being resiliently bendable, wherein opposed sections of the wire are configured the pair of hooks A for bending into a pair of hooks, wherein the pair of hooks are configured for supporting one or more articles, such that the one or more articles are maintained in a fixed position relative to the surface;
   a post engaged to and extending from the second face of the cup, the wire being loopedly positioned around the post, such that the wire is engaged to the post; and
   a disc engaged to the post distal from the cup, the disc being circumferentially larger than the post, such that the disc is positioned for preventing the wire from sliding off the post.

2. The fastening device of claim 1, wherein the cup comprises one or more of silicone, rubber, or elastomer.

3. The fastening device of claim 1 wherein the wire is one of a plurality of wires, each wire having a respective length, such that the plurality of wires comprises wires having a variety of lengths, such that a respective wire having an associated length is selectively bendable around the post for engaging the respective wire to the post, wherein opposed sections of the respective wire are configured for bending for creating the pair of hooks having a respective spacing between each said hook of the pair of hooks, and a respective distance between each hook and the surface, and a respective shape for each hook.

4. The fastening device of claim 1, further including a coating positioned around the wire, such that the wire is resistant to rusting.

5. The fastening device of claim 4, wherein the coating comprises rubber, silicone, or elastomer.

6. A fastening system comprising:
   an article used in maintaining personal hygiene;
   a cup, the cup being resiliently compressible, wherein the cup is configured for compressing against a surface for engaging a first face of the cup to the surface;
   a wire engaged to and extending from a second face of the cup, the wire being resiliently bendable, such that opposed sections of the wire are positioned for bending into a pair the pair of hooks are positioned for supporting the article, such that the article is maintained in a fixed position relative to the surface;
   a post engaged to and extending from the second face of the cup, the wire being loopedly positioned around the post, such that the wire is engaged to the post; and
   a disc engaged to the post distal from the cup, the disc being circumferentially larger than the post, such that the disc is positioned for preventing the wire from sliding off the post.

7. The fastening system of claim 6, wherein the cup comprises one or more of silicone, rubber, or elastomer.

8. The fastening system of claim 6, wherein:
   the article is one of a plurality of articles used in maintaining personal hygiene; and
   the wire is one of a plurality of wires, each wire having a respective length, such that the plurality of wires comprises wires having a variety of lengths, such that a respective wire having an associated length is selectively bendable around the post for engaging the respective wire to the post, such that opposed sections of the respective wire are positioned for bending for creating the pair of hooks having a respective spacing between each said hooks of the pair of hooks, and a respective distance between each hook and the surface, and a respective shape for each hook, such that the pair of hooks is positioned for engaging an associated article.

9. The fastening system of claim 6, further including a coating positioned around the wire, such that the wire is resistant to rusting.

10. The fastening system of claim 9, wherein the coating comprises rubber, silicone, or elastomer.

11. A fastening device comprising:
    a cup, the cup being resiliently compressible, wherein the cup is configured for compressing against a surface for engaging a first face of the cup to the surface, the cup comprising one or more of silicone, rubber, or elastomer;

a wire engaged to and extending from a second face of the cup, the wire being resiliently bendable, wherein opposed sections of the wire are configured the for bending into the pair of hooks, wherein the hooks are configured for supporting one or more articles, such that the one or more articles are maintained in a fixed position relative to the surface;

a post engaged to and extending from the second face of the cup, the wire being loopedly positioned around the post, such that the wire is engaged to the post;

a disc engaged to the post distal from the cup, the disc being circumferentially larger than the post, such that the disc is positioned for preventing the wire from sliding off the post;

a coating positioned around the wire, such that the wire is resistant to rusting, the coating comprising rubber, silicone, or elastomer; and the wire being one of a plurality of wires, each wire having a respective length, such that the plurality of wires comprises wires having a variety of lengths, such that a respective wire having an associated length is selectively bendable around the post for engaging the respective wire to the post, wherein opposed sections of the respective wire are configured for bending for creating a pair of hooks having a respective spacing between each said hook of the pair of hooks, and a respective distance between each hook and the surface, and a respective shape for each hook.

* * * * *